Figure 1:
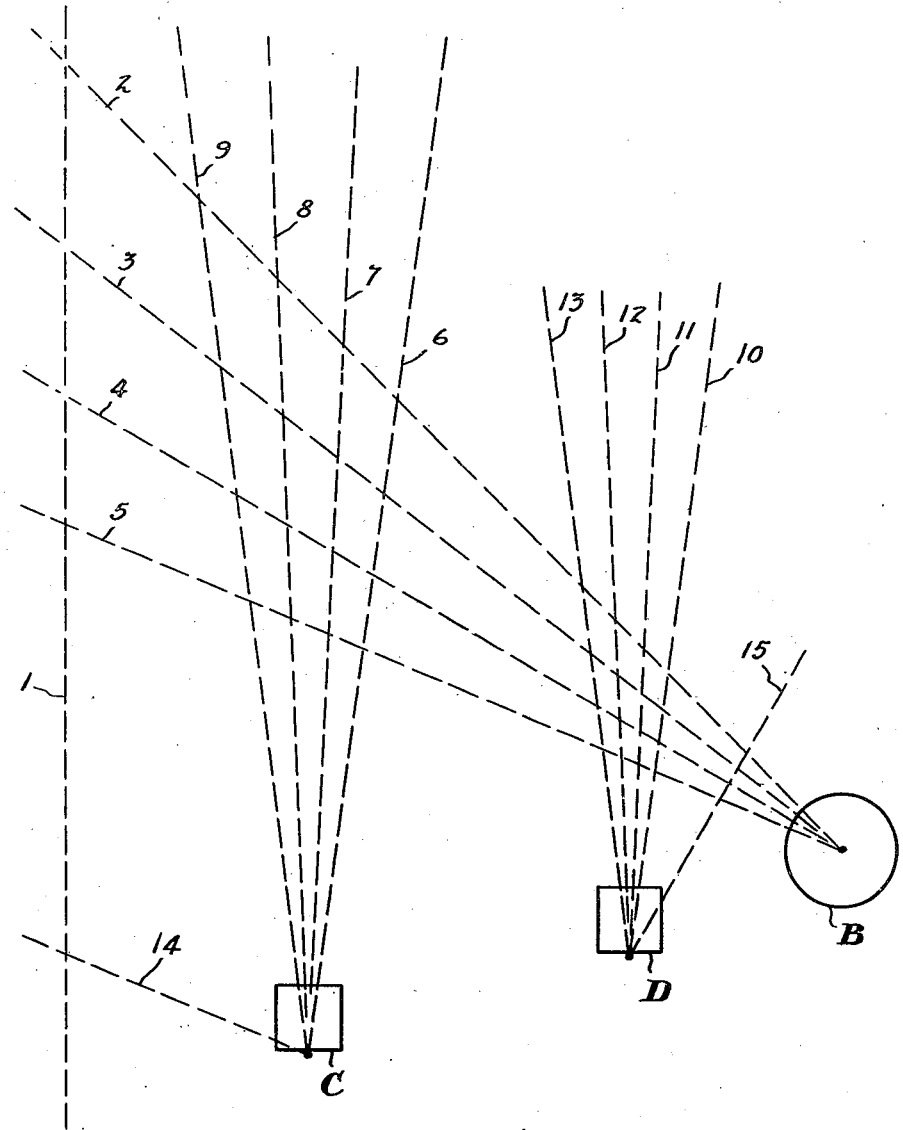

June 12, 1945.  W. M. O'NEIL  2,378,242
AIRCRAFT CONTROL
Filed Aug. 3, 1942  2 Sheets-Sheet 1

INVENTOR
William M. O'Neil
BY Evans + McCoy
ATTORNEYS

Patented June 12, 1945

2,378,242

UNITED STATES PATENT OFFICE 2,378,242

AIRCRAFT CONTROL

William M. O'Neil, Akron, Ohio

Application August 3, 1942, Serial No. 453,328

7 Claims. (Cl. 250—11)

This invention relates to a method of and apparatus for guiding aircraft to landing fields, and particularly to a method by which concealment of military airdromes is facilitated.

In order to conceal from the enemy the location of airdromes and landing fields, it is desirable to avoid flight of aircraft in a straight line path to the landing field and to avoid the transmission of long range directional radio beams from the landing field which might lead enemy craft to the vicinity of the field.

The present invention has for its object to facilitate concealment of airdromes and landing fields by providing a method of guiding homing aircraft by means of intersecting radio beams in various zigzag indirect or roundabout paths.

A further object of the invention is to provide a directional control system in which the main beams are projected from stations remote from the landing fields so as to make it more difficult for enemy pilots to locate the airdromes by following radio beams.

More specifically, the present invention aims to provide a system of directive beams transmitted from land stations and selectively tuned radio receiving sets mounted on the aircraft by means of which aircraft may be brought to the landing fields by various indirect and roundabout routes.

A further object of the present invention is to provide main radio beam projecting stations remote from the landing fields by means of which aircraft may be guided toward home from distant points to the vicinity of the landing fields, and to provide the landing fields with beam projecting apparatus by means of which the planes may be directed to the field, the directive beams being progressively weaker as the landing fields are approached and the beams projected from the landing fields being relatively weak and of short range so that they are not likely to affect the radio signal receiving apparatus of enemy aircraft.

A further object of the invention is to provide fortified beam transmitting stations remote from the landing fields for transmitting strong directional beams, such stations being equipped to strongly attack any enemy craft following a beam to the station.

A further object is to provide aircraft with automatic warning signals which are actuated upon approach to a fortified station.

With the above and other objects in view the invention may be said to comprise the method and apparatus as illustrated in the accompanying drawings hereinafter described and particularly set forth in the appended claims, together with such variations and modifications thereof as will be apparent to one skilled in the art to which the invention pertains.

Figure 2:
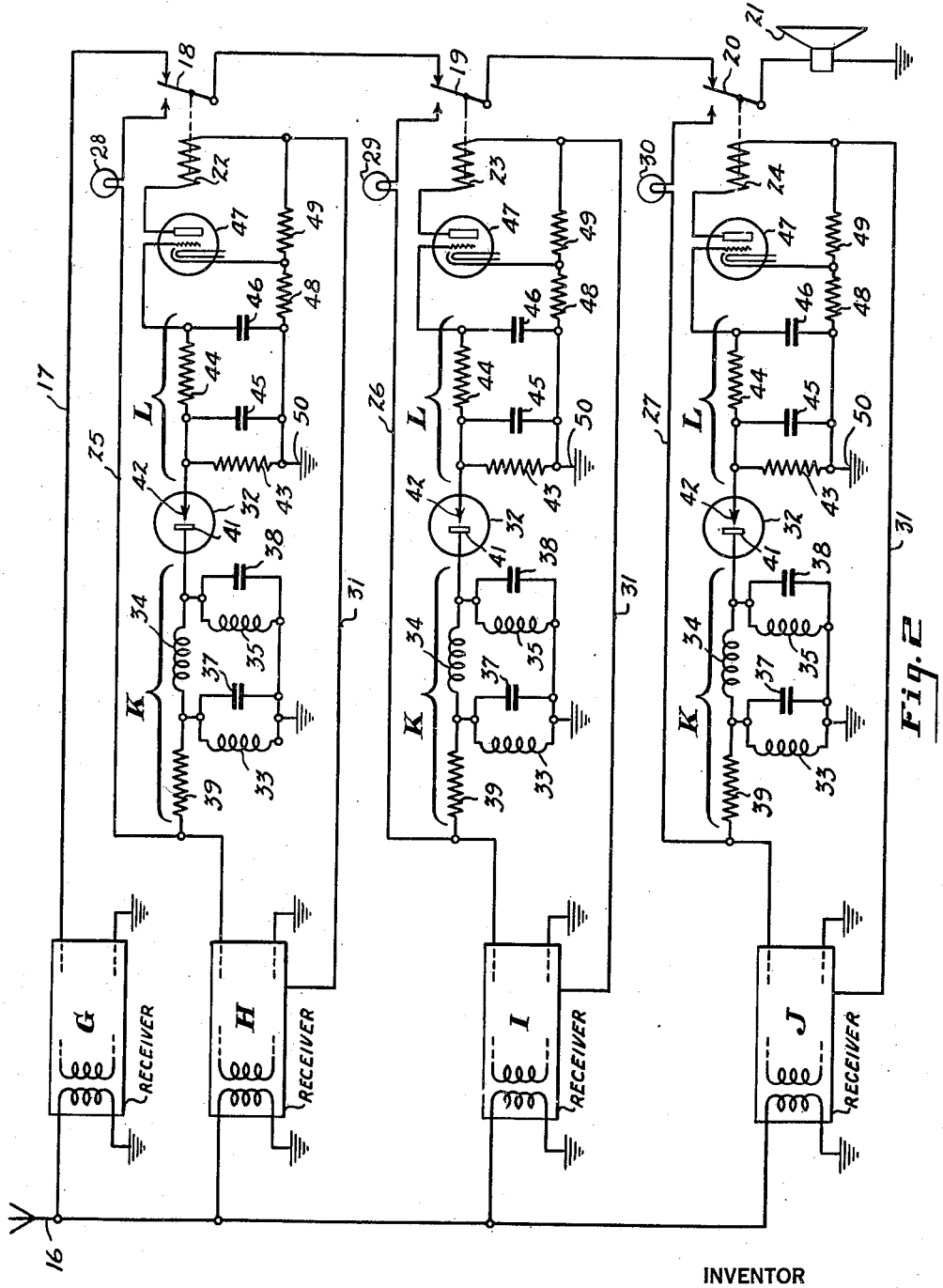

Reference should be had to the accompanying drawings forming a part of this specification, in which:

Figure 1 is a diagrammatic view showing a plurality of landing fields and a plurality of directional beam projecting stations, the beams being represented by straight lines which indicate the various routes for the aircraft; and Fig. 2 is a wiring diagram showing a selectively tuned radio receiving apparatus for actuating direction indicating devices upon an aircraft.

In Fig. 1 of the drawings two radio beam transmitting stations A and B are shown, together with two landing stations C and D. The stations A and B are preferably located at considerable distance apart and at a considerable distance from the intermediate landing fields C and D. It will be readily understood that the stations A and B may be located as much as 100 miles apart and that any desired number of landing fields, such as C and D, may be located between the beam projecting stations. Since the stations A and B project high power beams for long distances which may be picked up by the radio receiving sets of enemy planes, it is desirable that the stations A and B be in heavily fortified zones which may be camouflaged to indicate airdromes, so that if any enemy craft are lured into the vicinity of these stations they can be dealt with effectively.

As illustrated in Fig. 1, a main directional beam 1 is transmitted from the station A and a series of directional beams 2, 3, 4, and 5 are transmitted from the station B in a direction to intersect the beam 1. Beam 1 is a long range beam adapted to direct aircraft from distant points toward their home station. The beams 2, 3, 4 and 5 are preferably directed to intersect the beam 1 at a considerable distance from the landing fields C and D. The landing field C may be provided with apparatus to transmit beams 6, 7, 8 and 9 in a direction to intersect the beams 2, 3, 4 and 5, and the landing field D may be provided with beams 10, 11, 12 and 13 which cross the beams 2, 3, 4 and 5.

Each aircraft will be provided with a main radio receiving set tuned to the frequency of the beam 1 and actuating suitable direction indicating means to enable the pilot to follow the beam 1. The beams 2, 3, 4 and 5 from the station B, beams 6, 7, 8 and 9 from the field C, and beams 10, 11, 12 and 13 from the field D are each of a different frequency and each aircraft will be provided with a series of selectively tuned radio receiving sets which will operate a suitable signal when the plane comes into the path of a beam of the frequency to which a receiving set is tuned. By properly tuning a series of radio receiving sets of each aircraft, each aircraft is enabled to follow the route indicated by the intersecting beams in approaching its home landing field. For example, the receiving sets on one plane may be so tuned that by following the direction indicating means on the aircraft, the aircraft may be piloted along beams 1, 2 and 6 to the field C, or along beams 1, 2 and 10 to the field D. It will be readily understood that the direction of the beams transmitted from the stations A, B, C, and D may be varied so that the paths taken by the planes may be changed from time to time as desired. It will be apparent that planes which have a radio set tuned to the frequency of beams 6, 7, 8 or 9 will be directed to the landing field C and planes having sets tuned to the frequencies of beams 10, 11, 12 or 13 will be directed to the landing field D. The number of beams projected from stations B, C, and D may be increased or decreased as desired, depending upon the number of planes returned to the various fields. It will also be apparent that planes may be directed to landing fields other than those from which they originally came if for any reason this is desirable by simply discontinuing the beam or beams from one of the landing fields and projecting beams of the same frequency from the landing field where it is desired to land the planes.

Inasmuch as the stations A and B are fortified zones, it is desirable that friendly aircraft be kept away from these zones and to accomplish this interceptor beams 14 and 15 may be transmitted from the landing fields C and D across the beams projected from the stations A and B fairly close to the stations A and B, the intercepter beams 14 and 15 serving to energize warning signals on the plane and also serving as directive beams to conduct the aircraft to the air field in the event that the aircraft has passed the other directional beams intersecting the main beam.

In Fig. 2 of the drawings four aircraft receiving sets G, H, I and J are shown. The set G is the main set which is tuned to the frequencies of the main beam 1, and auxiliary sets H, I, and J are tuned to other frequencies so that they will be energized by beams other than the main directional beam 1. The receiving set H may be tuned to the frequency of one of the beams projected from the auxiliary station B, and the set I may be tuned to the frequency of one of the beams projected from one of the landing fields C or D. The fourth receiver J may be tuned to the frequency of the intercepter beams 14 and 15 to operate a warning signal and to direct the craft to one of the landing fields. The receiving sets G, H, I, and J are connected in parallel to an antenna 16 and the main set G is connected through a wire 17 and normally closed switches 18, 19, and 20 to a suitable direction indicator 21. The switches 18, 19 and 20 are in series and are adapted to be actuated by solenoids 22, 23, and 24 which are energized by the receiving sets H, I, and J. Actuation of the switch 18 by the solenoid 22 breaks the connection between the main receiving set G and the direction indicating device 21, and it connects the device 21 to the receiving set H through a wire 25. The switch 19 when energized by solenoid 23 connects the indicator 21 with the receiving set I through a wire 26 and the switch 20 when actuated by the solenoid 24 connects the device 21 with the receiving set J through a wire 27. Suitable signals such as lights or buzzers may be connected in the lines 25, 26 and 27 to be operated upon the actuation of the switches.

It is desirable that each switch actuating solenoid be sensitive only to vibrations of a narrow band of modulations of the radio wave to which its receiving set is tuned, and it is also desirable that the switches 18, 19, and 20 be operated only when a receiving set has been energized for a predetermined time. Each of the solenoids 22, 23, and 24 is connected with its receiving set through a band-pass filter K, a delay network L, and a wire 31, the band-pass filter K serving to prevent energization by any combination of frequencies other than those to which the receiving set and filter are tuned, and the delay network L serving to delay actuation of the solenoid so that the solenoid is not energized unless there is a persistent energization of the receiving set by a beam of the proper frequency. The band-pass filter K is tuned to the desired control frequency and this filter comprises a rectifier tube 32, suitable inductances 33, 34, and 35, capacitances 37 and 38, and a resistance 39, the inductances, capacitances and resistance being suitably arranged and having the desired values to permit passage therethrough only of frequencies within the desired narrow range.

The input side of the band-pass filter K is connected to the wire 25 leading to the audio output of the receiving set H, and the output side of the filter is connected to the plate 41 of the rectifier tube 32. The cathode 42 of the tube 32 is connected to the input side of the delay network L which comprises a high resistance 43, a second resistance 44, and capacitances 45 and 46. The output side of the delay network L is connected to the grid of a vacuum tube 47. The cathode of the tube 47 is suitably biased in the usual manner by selecting appropriate values for resistances 48 and 49 which are disposed between a ground 50 and the wire 31 which is connected to power supply. The circuits of the three auxiliary receiving sets H, I, and J are identical and it will be apparent that when the solenoid of the receiving set H is energized the connection between the receiving set G and the indicating device 21 is broken and connection is established between the receiving set H and the receiving device 21 through the wire 25 and switch 18. Likewise, when the solenoid 23 of the receiving set I is actuated, a connection is established between the receiver I and the indicating device 21 through the switch 19, and the connection between the receiving sets G and H and the indicating device 21 is broken. Also when the solenoid 24 of the receiving set J is energized, the receiving set J is connected to the indicating device 21 through the switch 20 and connections from receiving sets G, H, and I and the indicating device are broken.

It will be apparent that as many auxiliary receiving sets as desired may be connected as shown to operate switches in series and to successively control the indicating devices. One of the auxiliary sets will be tuned to the frequency of a beam emanating from the landing field to which the aircraft belongs and it will be apparent that this beam may be projected to intersect with the beams emanating from the station B or to intersect the main beam 1, so that the aircraft may be guided to its landing field over an indirect path from the main beam or may be guided directly to the landing field from the main beam 1. Before proceeding upon a flight the radio receiving sets of aircraft are tuned to the selected frequencies so that upon returning these receiving sets will be sensitive to beams projected from the various stations, so that the course of the plane in approaching its base may be suitably controlled. The receiving set G is tuned to the frequency of the main beam 1, the set H is preferably tuned to the frequency of one of the beams projected from the station B, and the receiving set I is tuned to the frequency of a beam projected from one of the landing fields. The receiving set J is tuned to the frequency of the intercepter beams 14 and 15. Signals 28, 29 and 30 indicate when an intersecting beam has been reached. The signal may be an audible signal or it may be simply lights. The signal 30 is a danger signal because it is actuated by the intercepter beams 14 and 15 close to the fortified stations A or B, and this signal may be a loud audible signal or a red light. The set J is connected to the direction indicating device so that the pilot may follow intercepter beams 14 or 15 to the landing field from which the beam is projected.

It will be apparent that the device of the present invention provides a means for guiding aircraft in a great variety of ways, that it may be used to detour planes around danger points, as well as to conceal the location of the aircraft bases.

It is to be understood that variations and modifications of the specific devices herein shown and described for purposes of illustration, may be made without departing from the spirit of the invention.

What I claim is:

1. Directive apparatus for aircraft comprising a main radio receiving set tuned to a given frequency, direction indicating means operatively connected to said receiving set, a second receiving set tuned to a different frequency, and means operated by said second receiving set for disconnecting said indicating means from the first set and connecting it to the second.

2. Directive apparatus for aircraft comprising a main radio receiving set, a direction indicating means operatively connected to said receiving set, a plurality of auxiliary radio receiving sets tuned to different frequencies, and means operated by each of said auxiliary sets when energized to connect the same to said direction indicating means and to disconnect the set previously connected to said indicating means.

3. Directive apparatus for aircraft comprising a station having means for projecting a main direction beam, a plurality of stations located laterally of the main beam and having means for projecting angularly disposed radio beams of different frequencies, an airplane having a main radio receiving set tuned to the main beam, a direction indicating means normally connected to the main receiving set, an auxiliary receiving set tuned to one of the auxiliary beams, and means operated by the auxiliary receiving set for disconnecting the main receiving set from the indicating means and connecting the auxiliary set thereto.

4. Directive apparatus for aircraft comprising a main power station having means for projecting a directional radio beam of a desired frequency, an auxiliary power station spaced laterally of the path of the main directional beam and having means for projecting directional radio beams of frequencies differing from that of the main beam across the main beam, landing fields having means for projecting directional radio beams across the paths of the beams from the auxiliary station, and aircraft, each provided with a receiving set tuned to the beam from the main power station and a plurality of receiving sets selectively tuned to frequencies of certain of the intersecting directional beams, direction indicating means normally operatively connected to said first mentioned receiving sets, and means operated by each of the other receiving sets when energized for connecting the indicating means thereto.

5. Directive apparatus for aircraft comprising a main power station having means for projecting a directional radio beam of a desired frequency, an auxiliary power station spaced laterally of the path of the main directional beam and having means for projecting directional radio beams of frequencies differing from that of the main beam across the main beam, landing fields having means for projecting directional radio beams across the paths of the beams from the auxiliary station, and intercepter radio beams across beams emanating from the power stations, and aircraft, each provided with a plurality of receiving sets selectively tuned to the frequencies of the directional beams, direction indicating means normally connected to the set tuned to the frequency of the main beam, means operated by each of the other receiving sets when energized for connecting the indicating means thereto, each aircraft having a radio receiving set tuned to the frequency of the intercepter beams, and a warning signal operated by the last mentioned receiving set.

6. Directive apparatus for aircraft comprising a signaling circuit, a main radio receiving set tuned to a given frequency and normally connected to said signaling circuit, a second radio receiving set tuned to a different frequency, and means operated by said second receiving set when energized for connecting the same to said signaling circuit and disconnecting said main receiving set from said signaling circut.

7. Directive apparatus for aircraft comprising a signaling circuit, a main radio receiving set tuned to a given frequency and normally connected to said signaling circuit, a plurality of auxiliary radio receiving sets tuned to different frequencies, and means operated by each of said auxiliary receiving sets when energized for connecting the same to said signaling circuit and disconnecting the receiving set previously connected to said circuit.

WILLIAM M. O'NEIL.